(12) United States Patent
Sebben (10) Patent No.: US 6,471,854 B1
(45) Date of Patent: Oct. 29, 2002

(54) LIQUID CONTAMINANT SEPARATING SYSTEM

(75) Inventor: Kurt Sebben, San Jose, CA (US)

(73) Assignee: Various Technologies Inc., San Jose, CA (US)

( * ) Notice: Subject to any disclaimer, the term of this patent is extended or adjusted under 35 U.S.C. 154(b) by 0 days.

(21) Appl. No.: 09/628,778

(22) Filed: Jul. 29, 2000

(51) Int. Cl.[7] .................................................. C02F 1/40

(52) U.S. Cl. ........................ 210/122; 210/171; 210/172; 210/242.3; 210/258; 210/540

(58) Field of Search ................................ 210/122, 168, 210/171, 172, 242.1, 242.3, 257.1, 258, 259, 299, 519, 538, 540

(56) References Cited

U.S. PATENT DOCUMENTS

| | | | | |
|---|---|---|---|---|
| 2,579,304 A | * | 12/1951 | Crawford | 210/540 |
| 2,624,463 A | * | 1/1953 | Freese | 210/519 |
| 2,874,850 A | * | 2/1959 | Unthank | 210/540 |
| 4,422,931 A | * | 12/1983 | Wolde-Michael | 210/519 |
| 5,059,312 A | * | 10/1991 | Galletti | 210/122 |
| 5,378,376 A | * | 1/1995 | Zenner | 210/122 |
| 5,454,937 A | * | 10/1995 | Lewandowski | 210/171 |
| 5,601,705 A | * | 2/1997 | Glasgow | 210/122 |
| 5,693,218 A | * | 12/1997 | Yamamoto et al. | 210/242.3 |
| 6,159,362 A | * | 12/2000 | Gilmore | 210/122 |

\* cited by examiner

*Primary Examiner*—Christopher Upton
(74) *Attorney, Agent, or Firm*—The Kline Law Firm (57) ABSTRACT

A liquid contaminant separation system that includes a liquid surface skimmer having an interior with a wall perimeter sealed by a vertically sliding float. The float has a tubular body with slots in the tube wall, and a vortex cavity in an upper section thereof. The structure of the float provides for flow of liquid from a supply reservoir through the slots in the float wall, over a top edge of the float into the vortex cavity, and then down into the collection reservoir of the float. The float level is determined by the level of liquid in the collection reservoir. Vertical slots in the wall of the collection reservoir extend above the level of liquid in the supply reservoir. The float body must be sufficiently iong so that lower ends of the slots are blocked by the float body. This ensures that liquid from the supply reservoir will flow into the float only at the top edge of the float, thereby enabling the system to effectively separate the desired liquid from the contaminating liquid. After liquid is accumulated in the collection reservoir of the float, the liquid is pumped at a controlled rate from the collection reservoir to a separation chamber. The liquid in the collection reservoir of the float is initially a mixture of desired liquid and contaminants. The separation chamber allows the liquid to be efficiently removed from the mixture. The contaminating liquid is then removed from the separation chamber for disposal. The remaining liquid is pumped into a filter chamber, where any particulate contamination present in the liquid is removed.

24 Claims, 10 Drawing Sheets

LIQUID CONTAMINANT SEPARATING SYSTEM

BACKGROUND OF THE INVENTION

1. Field of the Invention

The present invention relates generally to methods and apparatus for removing a contaminant from a surface of a liquid, and more particularly to a method utilizing an apparatus including a float in a tubular structure for skimming material from a surface of liquid in a collection reservoir, wherein the apparatus automatically adjusts the float level to accommodate any density or viscosity of liquid.

2. Description of the Prior Art

Many methods and devices for skimming a liquid surface have been conceived to be used in various areas of technology, such as in cleaning the surface water in a swimming pool, and for removing oil from water or other coolants used in machining operations. One of the problems inherent in any such skimming operation is the need to remove only the unwanted surface material liquid, while leaving the desired liquid intact. For example U.S. Pat. No. 5,897,773 by Rhodes describes a funnel-like float device with an open-ended tube attached to the funnel that has its buoyancy carefully calculated to place the lip of the float collection plane at the interface between the upper, lighter liquid to be skimmed off and the lower, heavier liquid. U.S. Pat. No. 5,814,213 by Glasgow describes a similar device having a float with a carefully designed buoyancy to maintain the collection level at an optimum position.

One shortcoming of the prior art devices is that the float can only be designed to effectively accommodate a single set of conditions, those conditions including the thickness and density of the upper liquid and the density of the lower liquid. Therefore, in order to assure complete skimming of the upper fluid in the prior art devices, it is necessary to design the buoyancy of the float so that the collection level is always at or below the interface between the upper and lower fluid. This means that in most cases, a significant quantity of the lower, heavier fluid is skimmed off with the upper fluid. Such an operation is clearly lacking in efficiency. In cases where the lower fluid is, for example, an expensive machine coolant, the inefficiency can be quite costly.

Accordingly, it is an object of the present invention to provide an efficient system of removing a contaminant from a surface of a liquid. The system must be such that only the contaminating fluid is removed, leaving the desired fluid undisturbed.

It is a further object of the present invention to provide a system wherein the float level is self-adjusting so as to accommodate any density or viscosity of liquid.

It is a still further object of the present invention to provide a system that is far less expensive than current art methodology.

It is yet another object of the present invention to provide a system that allows the user to easily and efficiently remove the contaminant fluid from the system.

SUMMARY OF THE INVENTION

A preferred embodiment of the present invention includes a liquid surface skimmer having an interior with a wall perimeter sealed by a vertically sliding float. The float has a tubular body with slots in the tube wall, and a vortex cavity in an upper section thereof. The structure of the float provides for flow of liquid from a supply reservoir through the slots in the float wall, over a top edge of the float into the vortex cavity, and then down into the collection reservoir of the float.

The float level is determined by the level of liquid in the collection reservoir. Vertical slots in the wall of the collection reservoir extend above the level of liquid in the supply reservoir. The float body must be sufficiently long so that lower ends of the slots are blocked by the float body. This ensures that liquid from the supply reservoir will flow into the float only at the top edge of the float, thereby enabling the system to effectively separate the desired liquid from the contaminating liquid.

After liquid is accumulated in the collection reservoir of the float, the liquid is pumped at a controlled rate from the collection reservoir to a separation chamber. The liquid in the collection reservoir of the float is initially a mixture of desired liquid and contaminants. The separation chamber allows the liquid to be efficiently removed from the mixture. The contaminating liquid is then removed from the separation chamber for disposal. The remaining liquid is pumped into a filter chamber, where any particulate contamination present in the liquid is removed.

In operation, the surface skimmer is secured in the supply reservoir at a position such that the top of the float body, with the pump off and the system at an at-rest equilibrium, is above the surface level of the liquid in the supply reservoir. The separation process is started by turning the pump on, causing fluid to be pumped from the collection reservoir, which in turn causes the float to drop until the upper edge of the float reaches the level of the liquid in the supply reservoir. At this operating equilibrium point, fluid from the surface of the supply reservoir spills over the float edge, enters the vortex cavity of the float and runs down into the collection reservoir.

If the pump speed is such that the rate of liquid leaving the collection reservoir exceeds the rate of spillage from the supply reservoir into the float, the level of the float continues to drop, and as a result the rate of spillage increases. This continues until the rate of spillage from the supply reservoir into the float equals the rate of evacuation from the collection reservoir to the separation chamber. The initial liquid removed from the supply reservoir will be a mixture of contaminants and desired liquid. As the system operates, the contaminants will be removed until a pure desired liquid remains.

DETAILED DESCRIPTION OF THE INVENTION

Figure 1:
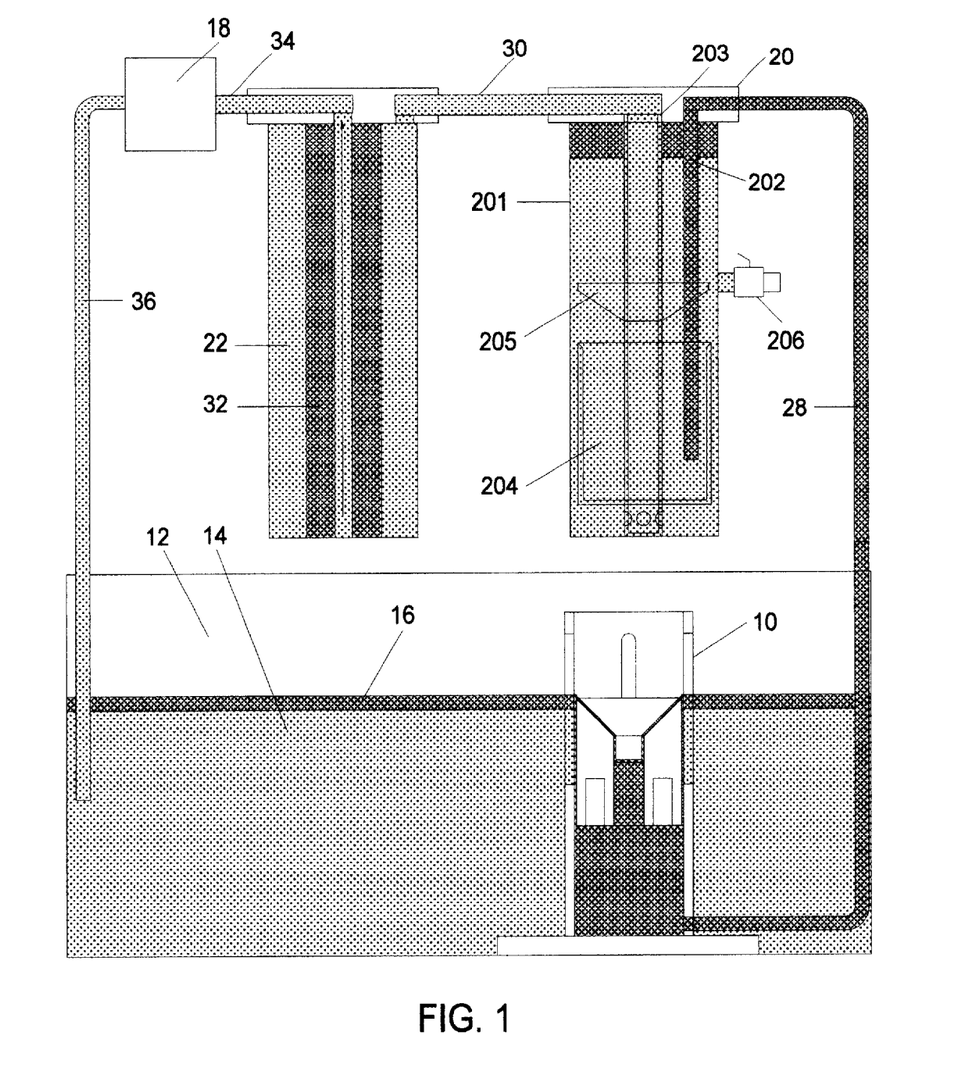
FIG. 1 is a sectional view of the fluid contaminant separating system of the present invention showing the liquid flow pattern.

A preferred embodiment of the fluid contaminant separating system of the present invention is illustrated in FIG. 1. The system comprises a surface skimmer 10 installed in a supply reservoir 12. The supply reservoir 12 holds a liquid mixture of a first desired liquid 14 and a second contaminant liquid 16. A pump 18 draws liquid from the surface skimmer 10 into a separation chamber 20 where contaminating liquid 16 is removed. The liquid mixture then flows to a filter chamber 22 where any particulate contamination present is removed. The cleaned liquid then flows back to the supply reservoir 12. The process is continued until the required purity of the desired liquid 14 is achieved.

The construction and operation of the system is based on the properties inherent in the two liquids being separated. The two liquids must be immiscible, and the contaminant liquid 16 must have a lower specific gravity than the desired liquid 14. This causes the contaminant liquid 16 to essentially float on top of the desired liquid 14, thereby making the physical separation process possible.

The surface skimmer 10, shown in FIGS. 1–5, comprises a vertically oriented collection assembly 24 with a cylindrical housing 241 mounted on a base 242. The housing 241 includes a plurality of slots 243 that pass through the wall of the vertical portion of the housing 241. An outlet 244 is provided at a lower end of the housing 241.

A float 26 is contained in the housing 241 of the collection assembly 24. Float 26 has a vortex cavity 261, preferably of funnel shape, that tapers downward from a top edge 262 of the float, to a float drain 263. This structure allows liquid to flow from the supply reservoir 12, over the top edge 262 of the float 26, through the drain 263 and into a collection reservoir 245 of the skimmer 10. In the preferred embodiment, the float 26 has a cylindrical outer surface dimensioned to slide within the housing 241, while still forming a barrier to prevent liquid flow around the float 26. Development of the device has shown that a clearance of 0.051" to 0.125" (depending upon the specific application) is optimal. The float 26 must be formed from material that is buoyant in the liquids being separated. The buoyancy of the float 26 can be adjusted by machining air cavities 264 into a lower surface of the float 26.

Figure 6:
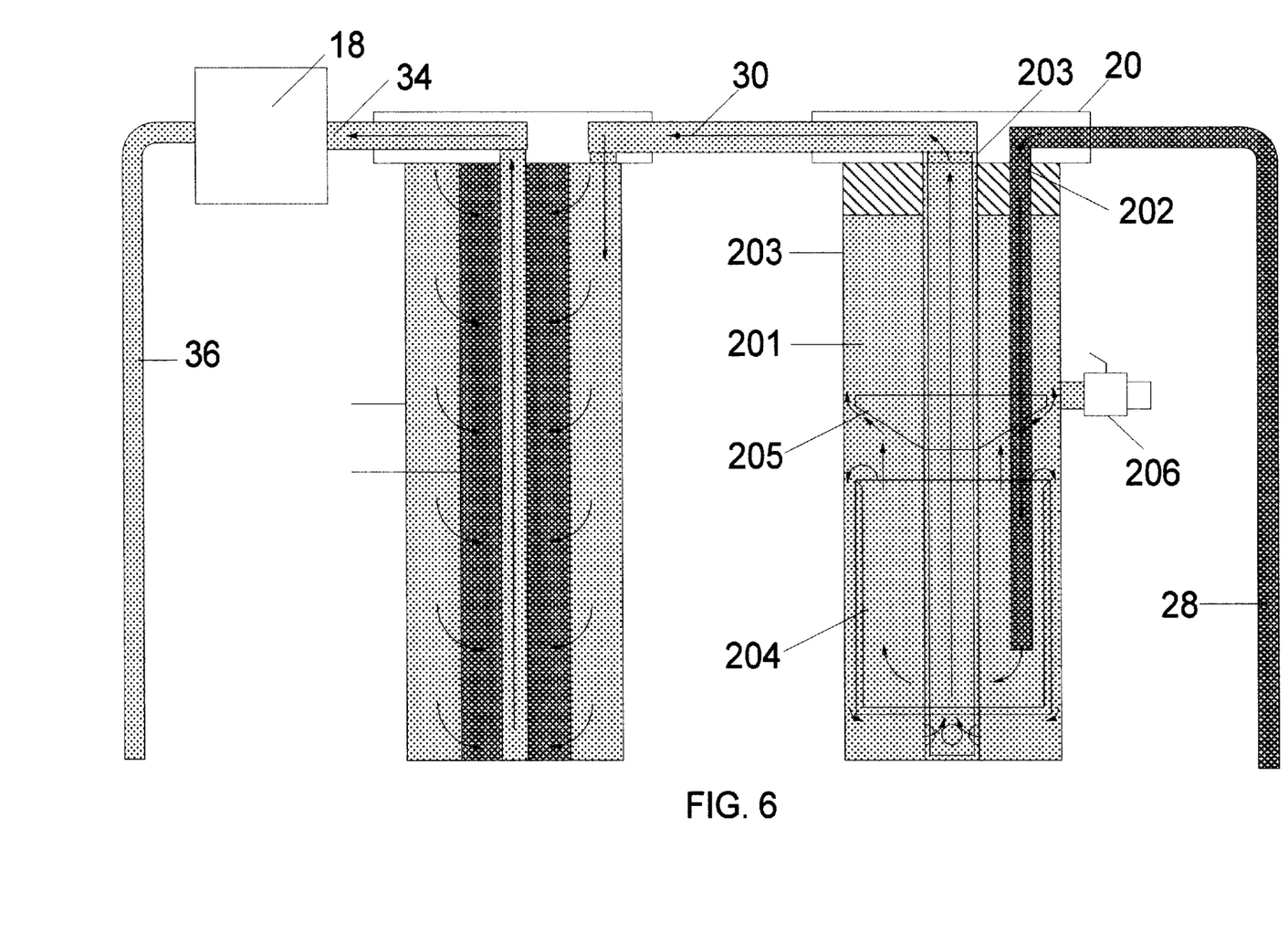
FIG. 6 is a more detailed sectional view of the separation chamber and the filter chamber.

Referring now to FIG. 6, the skimmer 10 is in communication with the separation chamber 20 by means of a first connecting tube 28 attached to the outlet 244 of the skimmer 10. The separation chamber 20 comprises a cylindrical housing 201 with an inlet 202 and an outlet 203. The liquid mixture that is pumped out of the skimmer 10 flows through the tube 28 into a baffle 204 contained within the housing 201. The receiving baffle 204 is suspended near a lower end of the separation chamber 20. As the liquid mixture flows out of the tube 28 into the receiving baffle 204, the liquid flow is reduced in velocity and redirected upward toward a deflector plate 205 suspended above the mouth of the baffle 204.

The conformation of the baffle 204 and the deflector plate 205 reduces turbulence in the flow pattern of the liquid. It has been discovered during the development of the system that angling the lower surfaces of the deflector plate 205 at 29.5° relative to horizontal, and tapering the lip of the upper edge of the baffle 204 at a like angle, provides the optimal flow pattern in the separation chamber 20. The laminar flow pattern, in addition to the tendency of the contaminating liquid 16 to adhere to the deflector plate 205, reduces the tendency of the contaminant liquid 16 to remix in the separation chamber with the desired liquid 14. The liquid trapped in the top of the separation chamber 20 is therefore nearly pure contaminating liquid 16.

The separation chamber 20 thus fills from the top down with concentrated contaminating liquid 16. When the level of the contaminating liquid 16 passes a drain valve 206 in the wall of the separation chamber 20, the user simply opens the drain valve 206 to draw off very concentrated contaminating liquid 16. The contaminating liquid 16 can then be disposed of or recycled. It should be noted that the pump 18 must be turned off when draining the contaminating liquid 16 from the separation chamber 20.

The remainder of the liquid mixture, now chiefly desired liquid 14, is drawn by the pump to a lower end of the separation chamber 20 where it enters a second connecting tube 30, which is in communication with the filter chamber 22. In the filter chamber 22, the desired liquid simply passes through a particulate filter 32. The filter 32 removes bacteria and metal fines that may be suspended in the desired liquid 14. After filtering, the desired liquid 14 passes through a third connecting tube 34 into the pump 18, and then back to the supply reservoir 12 through a fourth connecting tube 36.

Figure 2:
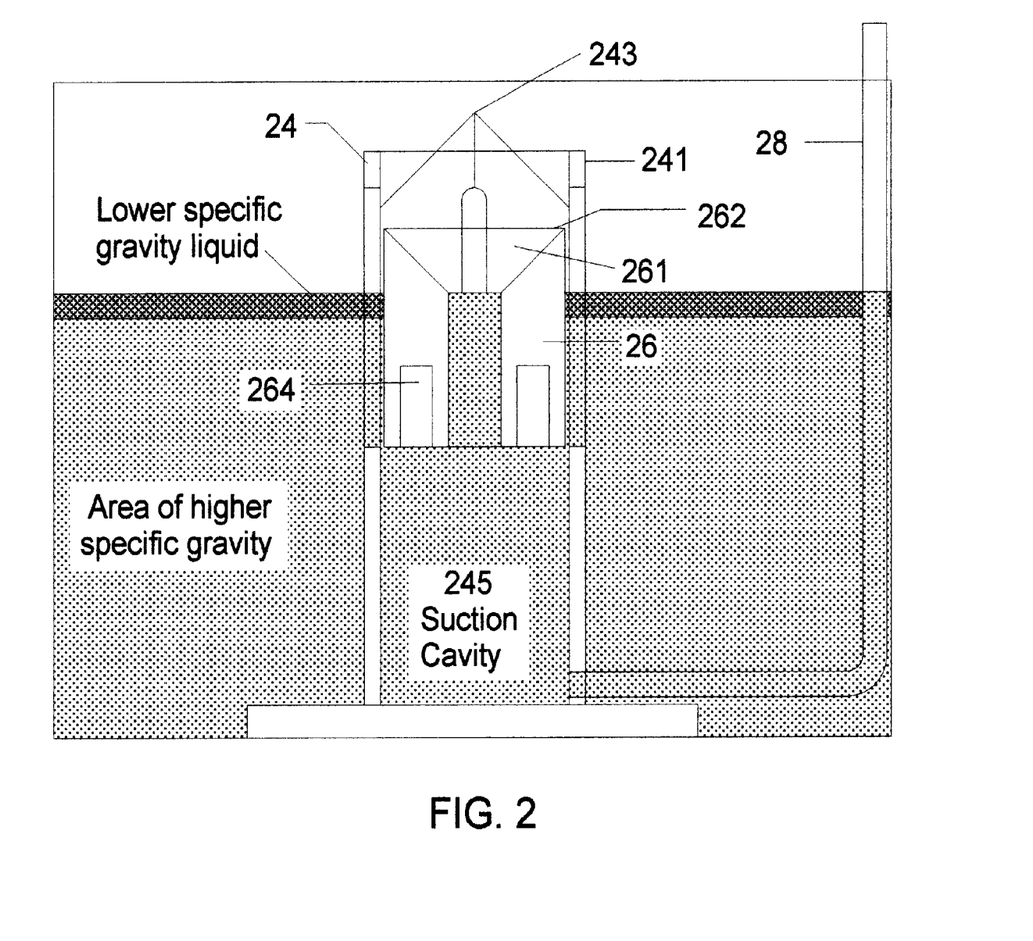
FIG. 2 is a sectional view of the skimmer positioned in the supply reservoir with the system in an off state.

Overall operation of the separating system, with reference first to FIG. 2, is as follows: The skimmer 10 is placed in the supply reservoir 12 at a position so that the collection assembly 24 protrudes above the surface of the liquid. The top edge 262 of the float 26 must also be above the liquid surface. In this at-rest equilibrium position, the body of the float 26 blocks the slots 243 so that liquid does not enter the collection assembly 24. If the float 26 does not ride high enough in the liquid for a given application, the buoyancy of the float 26 is adjusted by increasing the size or number of air cavities 264. The size of the skimmer 10 and the buoyancy of the float 26 can be modified to accommodate various liquid mixtures, depending on the density of the material used for the float and the specific gravities of the liquids to be separated.

Figure 3:
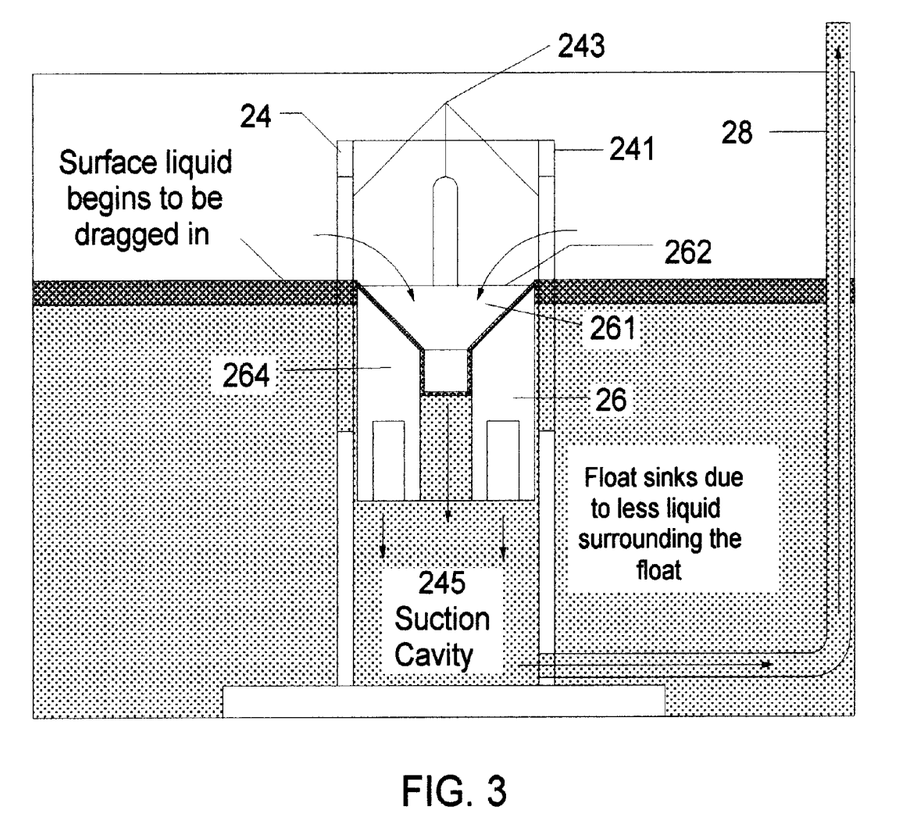
FIG. 3 is a sectional view of the skimmer in the supply reservoir immediately after activation of the pump.

When the system is activated, the situation changes to that depicted in FIG. 3. When the pump 18 is turned on, liquid is sucked out of the collection reservoir 245, creating a low pressure zone beneath the float 26. The float 26 lowers in response to the reduced supporting pressure, until the top edge 262 of the float 26 is beneath the surface level of the liquid. As the top edge 262 falls beneath the surface of the liquid, the slots 243 are unblocked and liquid begins to flow into the vortex cavity 261. The liquid flows through the vortex cavity 261 and into the drain 263 of the float, increasing the liquid displacement under the float 26. As the liquid flows into the drain 263, the float 26 achieves a stable buoyancy so that the top edge is just beneath the surface level of the liquid. The exact level of the top edge 262 depends on the viscosity of the liquid at the surface. More viscous liquids will cause the float 26 to ride lower in the liquid, while thinner liquids cause the float 26 to rise slightly. This self-adjusting feature of the float 26 allows the separation system to maintain the same flow rate for all liquid viscosities within the operating range set for the system. The float 26 will seek the level where the flow rate of liquid into the vortex cavity 261 equals the flow rate liquid being removed from the collection reservoir 245 by the pump 18.

Figure 4:
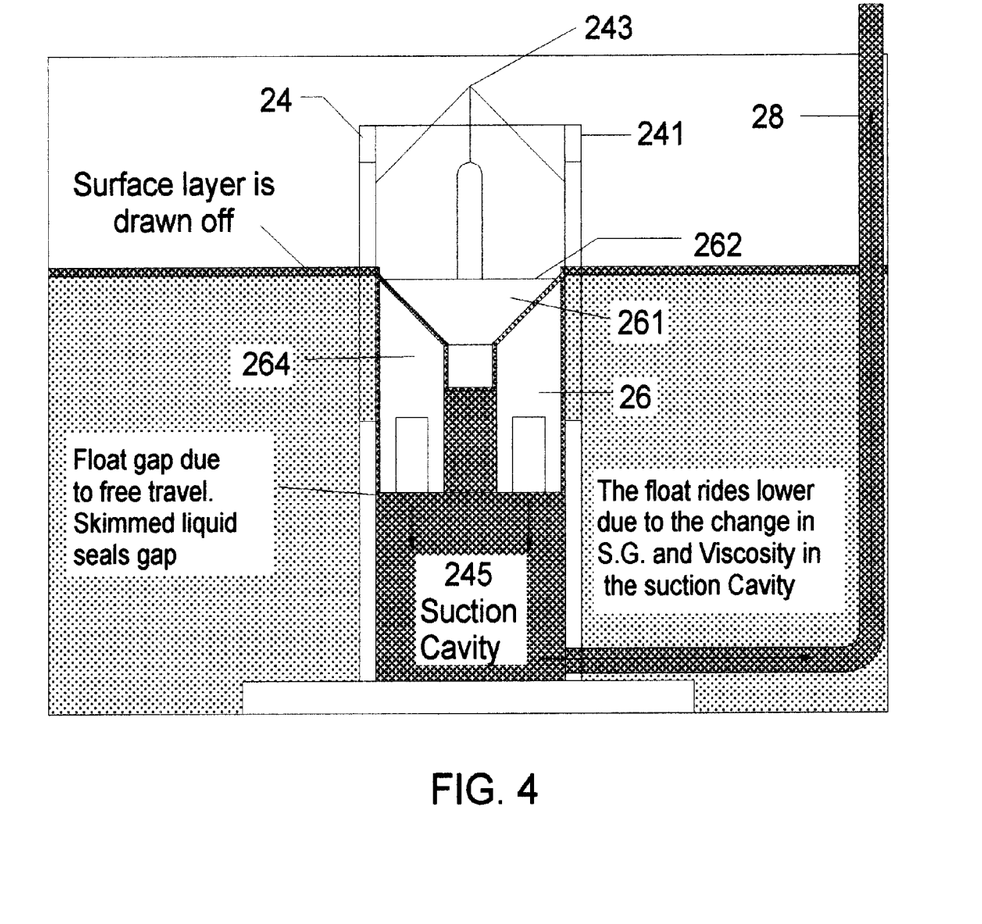
FIG. 4 is a sectional view of the skimmer after the system has operated for a brief time.

After a short period of operation, the system reaches the operating equilibrium illustrated in FIG. 4. In this state, the more viscous contaminant liquid 16 has filled the collection reservoir 245. The higher viscosity of the contaminant liquid 16 ensures that the less viscous desired liquid 14 does not flow around the float body and into the collection reservoir 245. (Note that during startup, a certain amount of seepage of the desired liquid 14 around the float 26 into the collection reservoir 245 will occur.)

The operation of the system in the operating equilibrium will continue until the contaminant liquid 16 is removed from the supply reservoir 12. The skimming of the surface of the supply reservoir 12 is efficient due to the surface tension created by liquids when acted upon by air pressure and molecular cohesion. Liquids of different specific gravities and densities tend to have different surface tensions and molecular cohesions (molecular attractions). Therefore there is a surface cohesion effect both between the layer of contaminating liquid 16 and the air, and between the contaminating liquid 16 and the desired liquid 14. Due to this surface cohesion effect, the contaminant layer will tend to flow over the top edge 262 of the float 26 into the vortex cavity 261, continuously pulling the contaminant layer along, leaving the desired liquid behind, as long as the top edge 262 is at or near the level of the contaminating layer. If the top edge 262 is rapidly dropped below the interface of the contaminating liquid 16 and the desired liquid 14, the bond surface tension and cohesion of the liquid flowing over will be broken. If this occurs, a mixture of the liquids containing a significant percentage of desired liquid 14 will flow into the vortex cavity 261, and the efficiency of surface skimming will be reduced or eliminated entirely. In normal operation, with the pump 18 speed adjusted to allow the float edge 262 to remain at the proper level, the float will adjust to the changing density of the surface layer, allowing the lighter contaminating liquid 16 to be removed with a high degree of efficiency.

Figure 5:
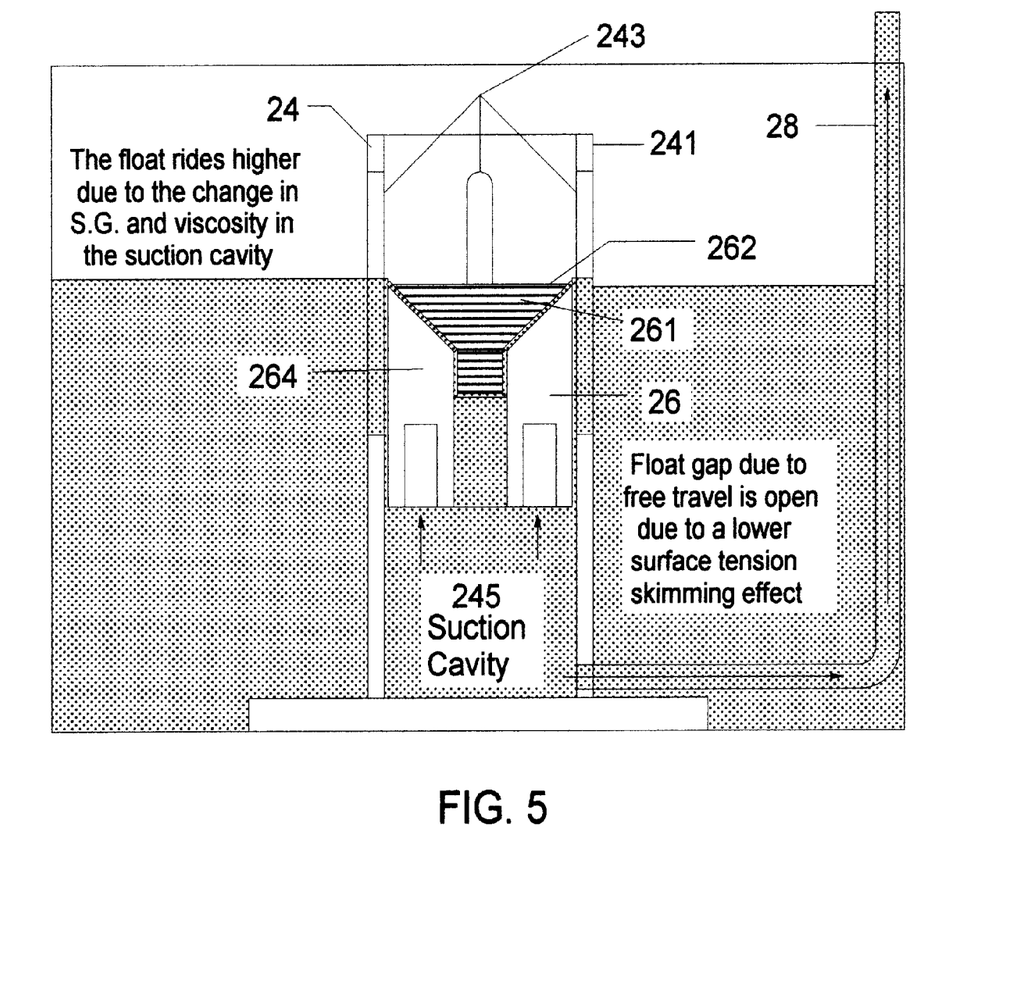
FIG. 5 is a sectional view of the skimmer after the contaminants have been removed so as to leave a homogenous liquid in the system.

After a longer period of operation, when the contaminating liquid has been removed from the supply reservoir, only the desired liquid 14 is left, i.e. a homogeneous liquid. This condition is shown in FIG. 5. The skimmer continues to operate, but the less viscous desired liquid 14 has replaced the more viscous contaminating liquid 16. The lower viscosity desired liquid 14 flows more easily over the top edge 262 than the higher viscosity contaminant liquid 16, and as a result the float 26 rides slightly higher in the liquid.

Figure 7:
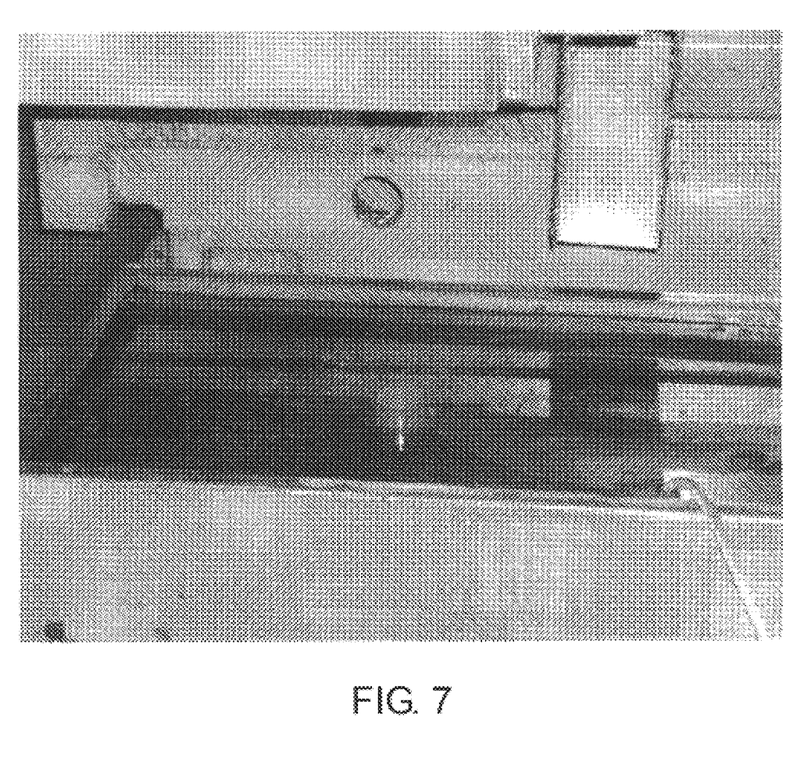
FIG. 7 shows the skimmer of the separation system installed in a machine sump tank containing a mixture of oil and coolant.
Figure 8:
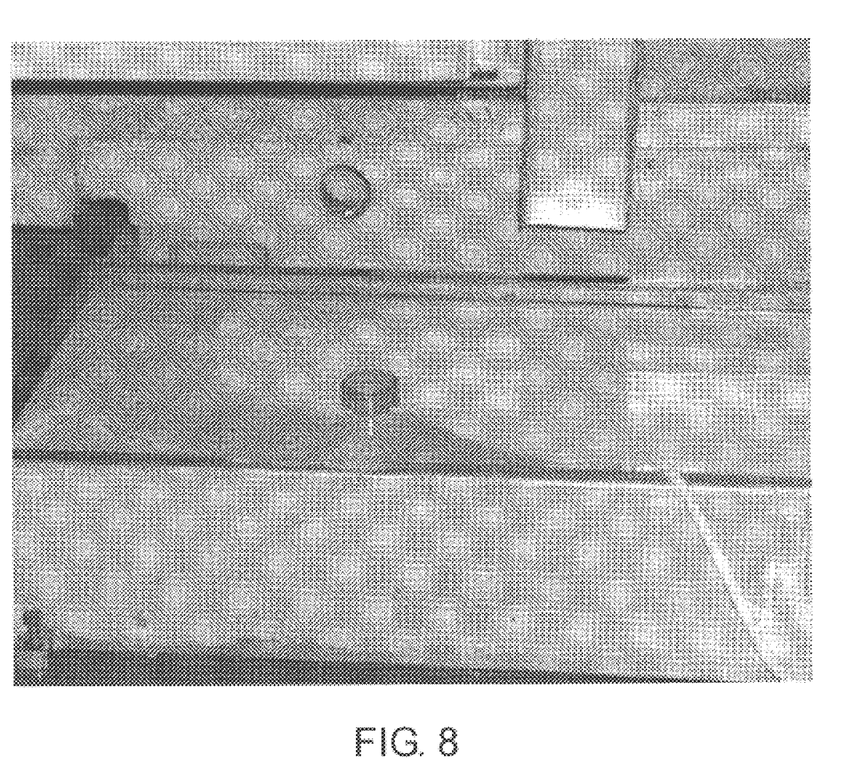
FIG. 8 shows the skimmer of the system installed in the machine sump after the system has operated for ten minutes.
Figure 9:
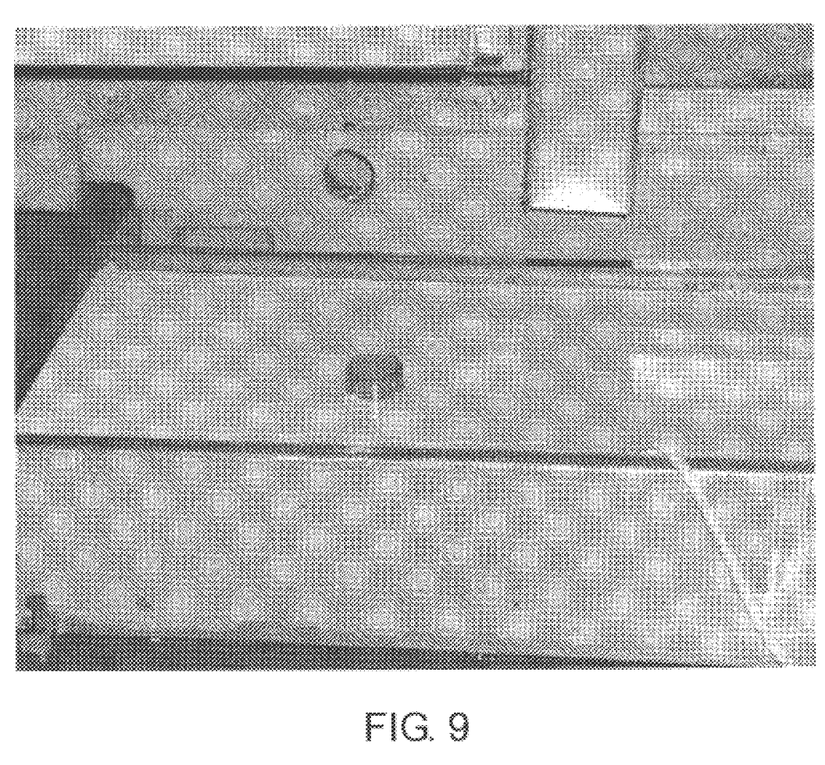
FIG. 9 shows the skimmer of the system installed in the machine sump after the system has operated for twenty minutes.
Figure 10:
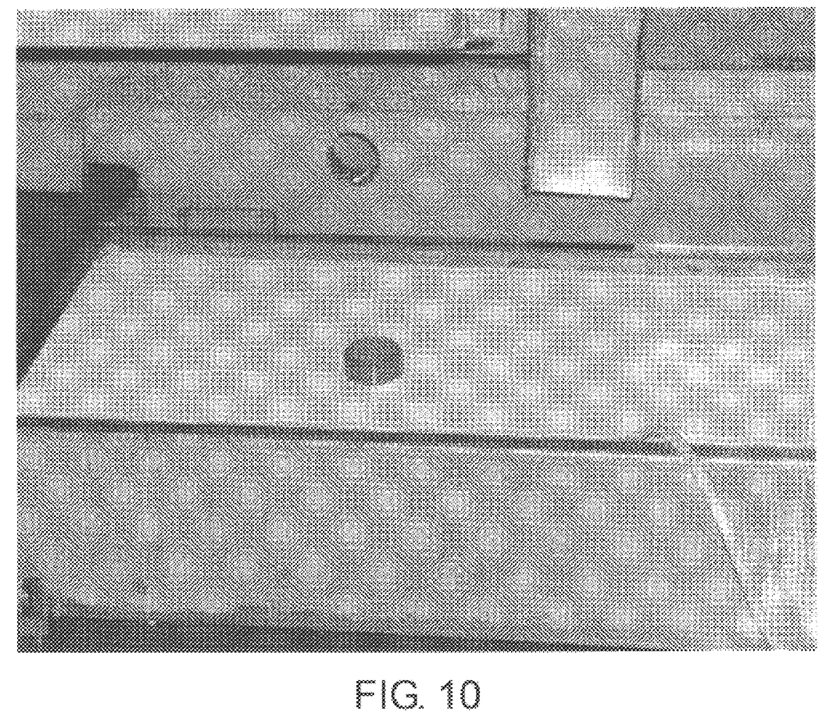
FIG. 10 shows the skimmer of the system installed in the machine sump after the system has operated for thirty minutes.

The efficiency of the system is illustrated in FIGS. 7–10, which are reproductions of photos of the sump tank of a machine that uses cutting oil and coolant. The surface skimmer 10 and the first connecting tube 28 of the separation system can be seen in the sump tank. FIG. 7 shows the sump tank before the system is activated, and it can be seen that the mixture visually appears to be chiefly oil. FIG. 8 shows the tank after ten minutes of operation of the system. FIG. 9 illustrates the tank after twenty minutes of operation, and FIG. 10 was taken after thirty minutes of operation. It can be sen in FIG. 10 that a homogenous liquid, the coolant, is all that remains in the tank.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention. For example, the collection reservoir could be mounted on a floating structure in the supply reservoir. Also, the tube and float do not have to be cylindrical in shape, although the construction is simplified with circular cross sections, and the vortex channel in the float can be any passage design from the top to the bottom of the float that will collect fluid spilling over from the main reservoir, i.e. supply reservoir, to the collection reservoir. While the development of the device has been accomplished with reference to a mixture of machining oil and coolant, it is clear that the device could as easily be used to remove spilled gas, oil, or other contaminants from bodies of water. These and other variations will be apparent to those skilled in the art, and are included in the spirit of the present invention.

I claim:

1. A liquid contaminant separating apparatus comprising:

a supply reservoir containing a mixture of a desired liquid and a contaminating liquid, said contaminating liquid floats on a surface of said desired liquid, a surface skimming means, and a pump to provide suction to said surface skimming means; wherein said surface skimming means comprises a float contained within a housing with a gap between said float and said housing such that said float is free floating within said housing, said float includes an inlet means therein to collect liquid from said surface of said supply reservoir, said float sliding within said housing and having a buoyancy such that when said pump is inactive, a top edge of said float rides above said surface of said supply reservoir, and when said pump is activated, said float drops to and remains at an equilibrium level at which said top edge of said float is lower than said surface of said supply reservoir, said gap between said float and said housing being of a dimension such that said gap is sealed by said contaminating liquid; such that when said pump is activated, said surface skimming means draws said contaminating liquid off said surface of said desired liquid, thereafter expelling through an outlet means of said surface skimming means said contaminating liquid from said supply reservoir.

2. The liquid contaminant separating apparatus of claim 1 wherein:

said housing of said surface skimming means comprises at least one slot, said slot being blocked by a body of said float when said pump is inactive, and said slot allowing liquid to pass therethrough when said pump is activated.

3. The liquid contaminant separating apparatus of claim 1 wherein:

a body of said float includes at least one air chamber therein to increase buoyancy of said float.

4. The liquid contaminant separating apparatus of claim 1 wherein:

said separating system further comprises a separation chamber to receive liquid pumped from said surface skimming means, said separation chamber comprising means to separate said contaminating liquid from said desired liquid.

5. The liquid contaminant separating apparatus of claim 4 wherein:

said separation chamber further comprises a receiving baffle to reduce a velocity of said liquid pumped from said surface skimming means, and to reduce turbulence in a flow pattern in said separation chamber.

6. The liquid contaminant separating apparatus of claim 5 wherein:

an inner surface of an upper edge of said receiving baffle is chamfered.

7. The liquid contaminant separating apparatus of claim 6 wherein:

an angle of said chamfer is 29.50°.

8. The liquid contaminant separating apparatus of claim 4 wherein:

said separation chamber further comprises a deflector plate, said deflector plate serving to reduce turbulence in a flow pattern in said separation chamber.

9. The liquid contaminant separating apparatus of claim 8 wherein:

said deflector plate includes a lower surface with an angle relative to horizontal.

10. The liquid contaminant separating apparatus of claim 9 wherein:

said angle is 29.5°.

11. The liquid contaminant separating apparatus of claim 1 wherein:

said separating system further comprises a filter chamber in line with said outlet means of said surface skimming means, said filter chamber comprising filter means therein to remove particulate matter from liquid pumped through said filter chamber.

12. A liquid contaminant separating apparatus comprising:

a supply reservoir containing a desired liquid and a contaminating liquid, said contaminating liquid floats on a surface of said desired liquid, a surface skimming means, a separation chamber to receive liquid pumped from said surface skimming means, said separation chamber comprising means to separate said contaminating liquid from said desired liquid, and a pump to provide suction; wherein said surface skimming means comprises a float contained within a housing with a gap between said float and said housing such that said float is free floating within said housing, said float includes an inlet means therein to collect liquid from said surface of said supply reservoir, said float sliding within said housing and having a buoyancy such that when said pump is inactive, a top edge of said float rides above said surface of said supply reservoir, and when said pump is activated, said float drops to and remains at an equilibrium level at which said top edge of said float is lower than said surface of said supply reservoir, said gap between said float and said housing being of a dimension such that said gap is sealed by said contaminating liquid; such that when said pump is activated, said surface skimming means draws said contaminating liquid off said surface of said desired liquid, thereafter expelling said contaminating liquid from said supply reservoir.

13. The liquid contaminant separating apparatus of claim 12 wherein:

said housing of said surface skimming means comprises at least one slot, said slot being blocked by a body of said float when said pump is inactive, and said slot allowing liquid to pass therethrough when said pump is activated.

14. The liquid contaminant separating apparatus of claim 13 wherein:

a body of said float includes at least one air chamber therein to increase buoyancy of said float.

15. The liquid contaminant separating apparatus of claim 12 wherein:

said separation chamber further comprises a receiving baffle to reduce a velocity of said liquid pumped from said surface skimming means, and to reduce turbulence in a flow pattern in said separation chamber.

16. The liquid contaminant separating apparatus of claim 15 wherein:

an inner surface of an upper edge of said receiving baffle is chamfered.

17. The liquid contaminant separating apparatus of claim 16 wherein:

an angle of said chamfer is 29.5°.

18. The liquid contaminant separating apparatus of claim 12 wherein:

said separation chamber further comprises a deflector plate, said deflector plate serving to reduce turbulence in a flow pattern in said separation chamber.

19. The liquid contaminant separating apparatus of claim 18 wherein:

said deflector plate includes a lower surface with an angle relative to horizontal.

20. The liquid contaminant separating apparatus of claim 19 wherein:

said angle is 29.5°.

21. The liquid contaminant separating apparatus of claim 12 wherein:

said system further comprises a filter chamber in line with said outlet means of said surface skimming means, said filter chamber comprising filter means therein to remove particulate matter from liquid pumped through said filter chamber.

22. A liquid contaminant separating apparatus comprising:

a float contained in a free floating manner within a housing, said float being able to slide upward and downward within said housing with no external mounting means, there being a gap between a body of said float and said housing, said gap between said float and said housing being of a dimension such that said gap is sealed by a contaminating liquid, said float includes a passage therein to collect said contaminating liquid from a surface of a supply reservoir, said float has a buoyancy such that when a pump driving said apparatus is inactive, a top edge of said float rides above said surface of said supply reservoir, and when said pump is activated, said float drops to a level at which said top edge of said float is lower than said surface of said supply reservoir.

23. The liquid contaminant separating apparatus of claim 22 wherein:

said housing of said apparatus comprises at least one slot, said slot being blocked by a body of said float when said pump is inactive, and said slot allowing liquid to pass therethrough when said pump is activated.

24. The liquid contaminant separating apparatus of claim 23 wherein:

a body of said float includes at least one air chamber therein to increase buoyancy of said float.

* * * * *